United States Patent
Lürkens

(10) Patent No.: US 7,110,267 B2
(45) Date of Patent: Sep. 19, 2006

(54) CIRCUIT AND METHOD OF IGNITING A HIGH-PRESSURE LAMP

(75) Inventor: Peter Lürkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 205 days.

(21) Appl. No.: 10/507,181

(22) PCT Filed: Mar. 10, 2003

(86) PCT No.: PCT/IB03/00865

§ 371 (c)(1),
(2), (4) Date: Sep. 9, 2004

(87) PCT Pub. No.: WO03/077612

PCT Pub. Date: Sep. 18, 2003

(65) Prior Publication Data

US 2005/0146285 A1 Jul. 7, 2005

(30) Foreign Application Priority Data

Mar. 13, 2002 (DE) ................... 102 11 001

(51) Int. Cl.
*H02M 3/335* (2006.01)
*H05B 37/02* (2006.01)

(52) U.S. Cl. ................... 363/21.02; 363/21.03; 363/21.01; 315/209 R; 315/224

(58) Field of Classification Search .............. None
See application file for complete search history.

(56) References Cited

U.S. PATENT DOCUMENTS

| 4,788,634 A | * | 11/1988 | Schlecht et al. ......... 363/21.03 |
| 5,233,273 A | * | 8/1993 | Waki et al. ................. 315/224 |
| 5,838,117 A | | 11/1998 | Nerone |
| 6,072,710 A | | 6/2000 | Chang |
| 6,160,362 A | | 12/2000 | Shone et al. ................ 315/308 |

\* cited by examiner

*Primary Examiner*—Tuyet Thi Vo

(57) ABSTRACT

The invention relates to an electronic circuit for igniting a high-pressure lamp. A resonant circuit 13 of the circuit is used to supply the ignition voltage for the high-pressure lamp. To enable an exact adjustment of the resonance frequency in the resonant circuit, it is proposed that the circuit also comprises converter 12 for generating an alternating voltage with which the resonant circuit 13 is excited and an oscillator 14, 16, 17 for driving the converter 12, the fundamental frequency of the output voltage of the oscillator being at least in proximity to an integral fraction of the resonance frequency of the resonant circuit 13. Finally, it is proposed that the circuit includes a feedback 17 from the resonant circuit 13 to the oscillator 14, 16, 17, whereby the fundamental frequency of the output voltage of the oscillator is so tuned that the resulting frequency of the output voltage of the oscillator corresponds substantially exactly to the integral fraction of the resonance frequency. The invention also relates to a corresponding lighting installation and a corresponding method.

12 Claims, 2 Drawing Sheets

CIRCUIT AND METHOD OF IGNITING A HIGH-PRESSURE LAMP

CROSS-REFERENCE TO RELATED APPLICATIONS

This application claims priority to International Application No. PCT/IB03/00865 published in the German language on Mar. 10, 2003, which claims the benefit of priority to German Application No. 102 11 001.8, which was filed in German language on Mar. 13, 2002.

BACKGROUND OF THE INVENTION

The invention relates to an electronic circuit and a method of igniting a high-pressure lamp, in particular a UHP (ultra high performance) or HID (high intensity discharge) lamp. The invention also relates to a lighting installation.

OBJECTS AND SUMMARY OF THE INVENTION

High-pressure lamps are known from prior art and are used, for example, in projectors. For ignition they require a short-time high voltage of up to several kilovolts. The required ignition voltage is therefore markedly higher than the normal operating voltage of the lamp and of its electronic system.

It is also known from existing practice that resonant circuits are used to ignite HID and UHP lamps. These circuits achieve a sufficiently high increase in the electronic operating voltage by exciting the resonance frequency of the resonance circuit. The high increase in voltage attainable with a resonant circuit when excited with a square-wave voltage characteristic having a frequency corresponding to the resonance frequency of the resonant circuit is expressed by $$\frac{V_{max}}{V_{DC}} = 1 + \frac{2}{\pi} \cdot Q.$$

In this equation $V_{DC}$ is the operating voltage and Q the quality factor of the resonant circuit.

U.S. Pat. No. 6,160,362 describes an electronic circuit for igniting a high-pressure lamp in which a resonant circuit is supplied with voltage for example, via a bridge circuit. The bridge circuit is switched by a control circuit, e.g. a microcontroller. It is proposed that the frequency of the voltage made available by the bridge circuit is first started far above the resonance frequency. The voltage across the lamp is detected and the frequency is reduced until the voltage required for ignition is reached. It is claimed that in this way the circuit is always operated at most at the voltage required for ignition. With this approach, however, it must be ensured that the frequency of the voltage supplied by the bridge circuit does not fall below the resonance frequency. Otherwise there is a danger that components could be damaged by excessively high currents. To ensure that the minimum required voltage is reached and that the frequency is not reduced below the resonance frequency, overdimensioning of the circuit is therefore required because of component tolerances.

Advantageously, the resonance of the oscillating circuit is not excited with a square-wave voltage characteristic having a frequency corresponding to the resonance frequency, but with a harmonic of such a square-wave voltage characteristic. In this way higher resonance frequencies can be utilized even when using electronic modules which switch comparatively slowly. A higher resonance frequency results in substantially smaller currents during ignition, so that smaller components can be used.

When harmonics are used, the relationship between the maximum attainable voltage and the operating voltage is calculated by:

$$\frac{V_{max}}{V_{DC}} = 1 + \frac{2}{k\pi} \cdot Q.$$

In this equation k is the ordinal number of the harmonic used. It is clear from the equation that if a harmonic is used to excite the resonant circuit the quality of the oscillating circuit must be correspondingly higher to achieve the same maximum voltage.

For example, if the operating voltage $V_{DC}$ is 400 V and the desired maximum voltage $V_{max}$ is 5 kV, and if the third harmonic is used, the required quality factor Q equals 54, whereas if an oscillation having the resonance frequency itself were used, Q would equal only 16.

In known electronic circuits for igniting high-pressure lamps the harmonic is made available by means of an oscillator with a fixed set frequency. The output signal of the oscillator then switches a converter, to the output of which a resonant circuit of suitable quality is connected.

However, the quality of the resonant circuit also influences the utilizable bandwidth of the resonant circuit. If the resonance frequency is not exactly matched, the voltage attained is less than the maximum attainable voltage. A relative frequency error of ½Q, that is, of 0.9% in the above example, is sufficient to cause the attained voltage to fall to a value of 71%. Even normal component tolerances produce deviations above this limit.

It is therefore an object of the invention to make possible a frequency control system for the electronic energization of a resonant circuit by means of which the excitation frequency autonomously adjusts itself to a fraction of the resonance frequency of the resonant circuit. An electronic circuit used for this purpose must be robust, must require no overdimensioning of the components used, and must prevent the frequency from falling significantly below the resonance frequency of the resonant circuit.

This object is achieved according to the invention by an electronic circuit for igniting a high-pressure lamp. The electronic circuit comprises a resonant circuit for providing an ignition voltage for the high-pressure lamp and an converter for generating an alternating voltage with which the resonant circuit is excited. The alternating voltage generated is preferably of square waveform. In addition, the electronic circuit according to the invention includes an oscillator to drive the converter. The fundamental frequency of the output voltage of the oscillator must be at least in proximity to an integral fraction of the resonance frequency of the resonant circuit. Finally, the electronic circuit according to the invention comprises a feedback from the resonant circuit to the oscillator. On the basis of this feedback, the fundamental frequency of the output voltage of the oscillator is tuned in such a way that the resulting frequency of the output voltage of the oscillator corresponds substantially exactly to the above-mentioned integral fraction of the resonance frequency.

A further object of the invention is achieved by a lighting installation which includes, in addition to the proposed electronic circuit, a high-pressure lamp connected to the resonant circuit of the electronic circuit.

This object is likewise achieved according to the invention by a corresponding method of igniting a high-pressure lamp by means of a resonant circuit supplied with an alternating voltage by a converter.

The invention is based on the idea that a feedback from the resonant circuit to the oscillator can be used to tune the frequency of an oscillation to a fraction of the actual resonance frequency. Although the actual resonance frequency of a resonant circuit cannot be precisely predetermined because of component tolerances, such a feedback, which supplies to the oscillator an indication of the frequency and the phase position of the oscillation in the resonant circuit, permits a precise adjustment of the excitation of the resonant circuit.

The fundamental frequency of the oscillator should already be close to an integral fraction of the resonance frequency. Otherwise, because of the feedback, the oscillator could adjust itself to a fraction above or below the anticipated fraction of the resonance frequency. The quality of the resonant circuit, in the case of an optimized circuit, is insufficient for a frequency at a fraction of the resonance frequency of a higher order than anticipated so that the required maximum voltage is not attained. In the case of an optimized circuit, damage to the components of the circuit is to be feared for a frequency at a fraction of the resonance frequency of a lower order than anticipated since in that case excessive power dissipation occurs.

It is an advantage of the invention that it permits a precise and autonomous adjustment of the harmonic to the resonance frequency. This makes possible a robust electronic circuit, since the integral fraction of the resonance frequency can be selected to be tuned to a desired quality of the resonant circuit and to a selected dimensioning of the components. Alternatively, given a selected integral fraction of the resonance frequency, the quality of the resonant circuit can be limited to the required minimum and overdimensioning of the components avoided.

Advantageous embodiments of the circuit and of the method according to the invention are the subject matter of the dependent claims.

The feedback should be able to measure, as far as possible without losses, the high voltages of, for example, up to 5 kV and to reduce them to a level which is suitable for processing by normal small-signal electronic circuits. At the same time, however, sufficient feedback should be ensured even at relatively low voltages, since the resonant circuit is not initially in resonance and therefore supplies only low voltages of, for example, 400 V.

In a preferred embodiment of the invention, the feedback is therefore effected by means of a capacitive antenna with which the frequency in the resonant circuit can be reliably detected even in the case of large voltage differences. Moreover, a capacitive antenna has low losses and makes the electronic circuit less sensitive to other capacitive influences which could occur at the high voltages.

If the electronic circuit is a printed circuit, the capacitive antenna advantageously takes the form of a suitable conductor track configuration. Such a conductor track configuration is cheaper and more reliable than a capacitance element constructed as a separate unit.

Although the circuit according to the invention allows the resonant circuit to be put reliably into resonance mode, the maximum voltage resulting from resonance cannot be exactly predetermined. The reasons are, firstly, component tolerances and, secondly, external influences such as air humidity. In addition, as the temperature of the resonance coil of the resonant circuit increases, the maximum voltage initially increases. Once a certain voltage is exceeded, however, this can cause damage to the components of the resonant circuit.

In a preferred embodiment of the electronic circuit according to the invention, therefore, the magnetic material of the resonance coil is so selected that it reaches saturation precisely when a desired voltage is reached. The desired voltage is normally the voltage required for ignition of the high-pressure lamp. In this way it can be ensured that a maximum value for the voltage of, for example, 5 kV is not exceeded. In addition, the saturation of the magnetic material has the advantage that, with rising temperatures, it initially decreases, inversely to the voltage, leading to a compensation of the two effects.

Through the adjustment of the saturation of the magnetic material to a desired voltage, therefore, further voltage control becomes superfluous.

The oscillator of the electronic circuit according to the invention can be realized by means of an analog comparator, but also by means of a digital PLL (phase locked loop). If a PLL is used, both the output of the inverter and the output of the resonant circuit should be captured for the feedback in order to enable on this basis an adjustment to a phase difference of exactly 90°.

These and other aspects of the invention are apparent from and will be elucidated with reference to the embodiments described hereinafter.

DESCRIPTION OF THE PREFERRED EMBODIMENTS

Figure 1:
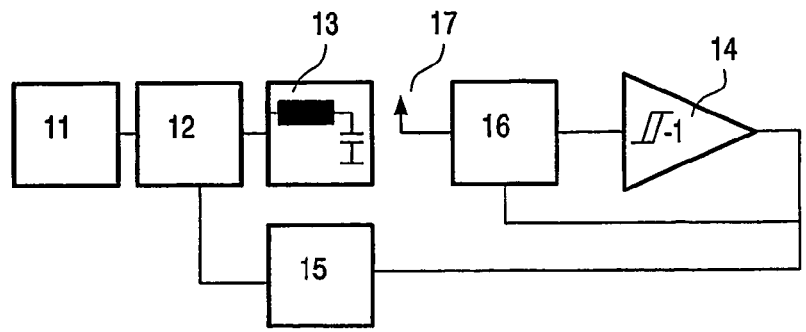
FIG. 1 shows a block diagram of a first embodiment of the circuit according to the invention having an analogue comparator.

The block diagram in FIG. 1 illustrates schematically a first embodiment of the electronic circuit according to the invention which is to be used to ignite a high-pressure lamp.

The electronic circuit illustrated includes a direct voltage source 11 which is connected to an inverter 12 which is drivable by means of switching elements. A resonant circuit 13 which is used to supply the ignition voltage for the high-pressure lamp is connected to the output of the inverter 12.

An antenna 17 which takes the form of the open end of a copper surface on the circuit board is used as the detector for the actual resonance frequency and is connected to a comparator 14 via a matching circuit 16. The output of the comparator 14, which is provided with a hysteresis, is back-coupled to the matching circuit 16. In addition, the output signal of the comparator 14 is fed back to the switching elements of the converter 12 via a delay unit 15.

The matching circuit 16 and the comparator 14 together form an oscillator which operates without tuning at least in proximity to an integral fraction of the anticipated resonance frequency of the resonant circuit 13.

The electronic circuit of FIG. 1 may form part of a lighting installation in which a high-pressure lamp (not shown) is connected to the resonant circuit 13.

For the frequency control system according to the invention, the antenna 17 captures the voltage characteristic across the resonant circuit and feeds it to the matching circuit 16. Although high voltages in the resonant circuit are captured by the antenna 17 with an attenuation of amplitude because of the capacitive configuration of the antenna 17, the voltage characteristic which is passed on does reflect the frequency in the resonant circuit for each voltage. The matching circuit 16 passes on the voltage characteristic received to the comparator 14 in such a way that the zero transitions coincide exactly in time with the switching of the comparator 14 if the output frequency of the comparator 14 corresponds exactly to an integral fraction of the resonance frequency of the resonant circuit 13.

To achieve this, the phase position of the coupling-in of the antenna signal is so selected that a lag of the zero transition, indicating that the resonance frequency is lower than the actual oscillator frequency, causes a delay of switching by the comparator. By contrast, a lead of the zero transition, indicating that the resonance frequency is higher than the actual oscillator frequency, causes an acceleration of switching by the comparator. The phase position of the voltage signal captured by the antenna 17 is offset by 90° with respect to the signal at the output of the converter 12 if the resulting switching frequency is exactly an integral fraction of the natural resonance frequency of the oscillating circuit.

The output signal of the comparator 14, the switching times of which are therefore precisely tuned to a fraction of the resonance frequency of the resonant circuit 13, is then used to trigger the converter 12 at a fraction of the resonance frequency.

The final phase position of the signal with which the converter 12 is triggered is determined by programming of the delay unit 15 of FIG. 1.

As compared to the high voltage of the resonant circuit 13, the output signal of the comparator 14 has a phase shift of 90° if the oscillator is exactly adjusted to an integral fraction of the resonance frequency. If the oscillator frequency is far above an integral fraction of the resonance frequency, the output signal of the comparator 14 is phase-shifted by 180° with respect to the high voltage of the resonant circuit 13. If, however, the oscillator frequency is far below an integral fraction of the resonance frequency, the output signal of the comparator 14 is not phase-shifted with respect to the high voltage of the resonant circuit 13.

To match the phase of the output signal of the comparator 14 to the phase required at the converter 12 for exciting the resonant circuit 13 with a harmonic of the resonance frequency, the delay unit 15 therefore provides a phase shift of 90° or a corresponding phase shift of 90°+n*180°, where n is a natural number. However, phase shifts of more than 270° are less advantageous because of the resulting long delay between measurement and triggering.

To achieve that the delay times unavoidably occurring during processing in the circuit do not prevent exact tuning, the delay unit 15 additionally causes a corresponding compensation of the delay in the signal path from the comparator 14 to the converter 12. This can be achieved in that a fixed phase shift of, for example, 270°, reduced by the previously determined, design-dependent delay times in the circuit, is set in the delay unit 15. The inversion required because of the opposite signs at 90° and at 270° can be effected, for example, in the converter.

Figure 2:
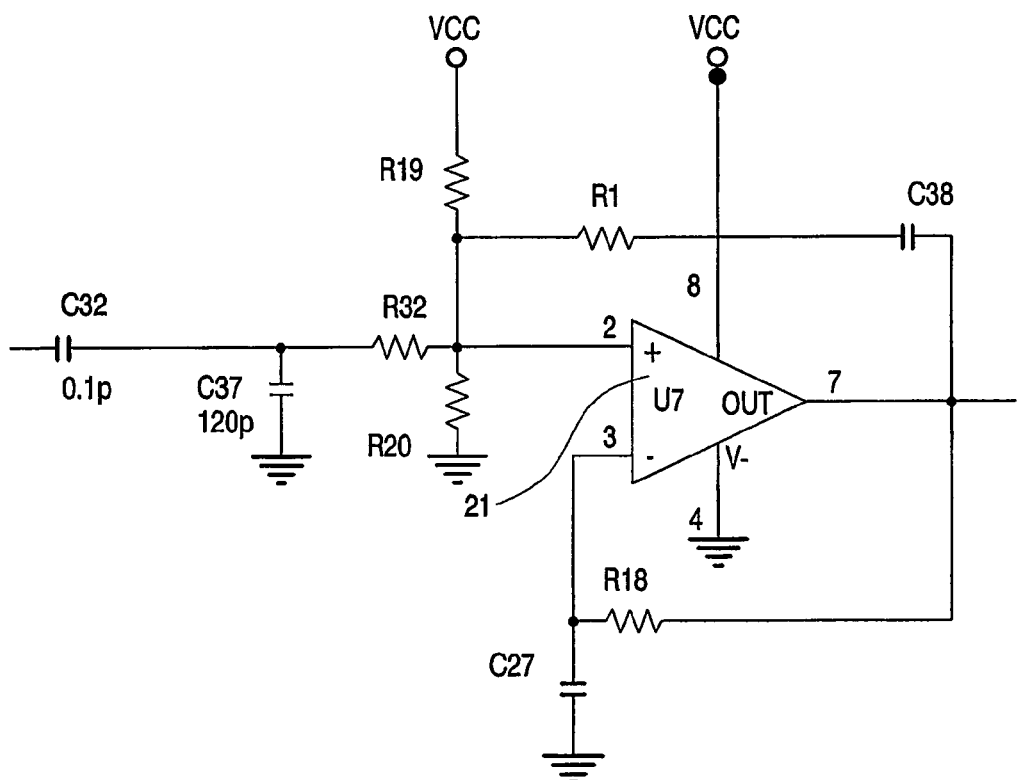
FIG. 2 shows an embodiment of an oscillator of the circuit according to the invention.

FIG. 2 shows a possible configuration of the oscillator formed by the antenna 17, the matching circuit 16 and the comparator 14. The analog oscillator shown in FIG. 2 is used to excite the resonance in the resonant circuit 13 with a harmonic of the resonance frequency having an ordinal number of k=3.

In the oscillator circuit a capacitor C32 of 0.1 pF, which represents the capacitive antenna 17, is connected via a resistor R32 to a first input 2 of an operational amplifier 21 functioning as a comparator. The connection between the capacitor C32 and the resistor R32 is connected to ground via a further capacitor C37 of 120 pF. The two capacitors C32 and C37 form a potential divider for the voltage captured by the antenna.

The connection between the resistor R32 and the first input 2 of the operational amplifier 21 is connected on one side to ground via a resistor R20 and on the other to a first supply voltage via a resistor R19. In addition, a further resistor R1 is connected to the output 7 of the operational amplifier 21 via a capacitor C38. The resistors R19, R20 and R1 together with the capacitor C38 produce the hysteresis of the comparator 14. At the same time the capacitor C38 prevents a reaction by direct voltage components, so that the symmetry of the output voltage of the operational amplifier 21 and therefore of the whole oscillator is ensured.

A second supply voltage is fed to the operational amplifier 21.

In addition, the output 7 of the operational amplifier 21 is fed back to the second input 3 of the operational amplifier 21 via a resistor R18, whereby the output frequency of the operational amplifier 21 can be tuned to the resonance frequency of the resonant circuit 13 captured via the capacitive antenna C32. The connection between the resistor R18 and the second input 3 is connected to ground via a frequency-determining capacitor C37 of 100 pF. The voltage across the capacitor C27 is thus applied to the second input 3 of the operational amplifier 21.

As long as no signal is received via the antenna C32, a square-wave output signal of a certain fundamental frequency is produced at the output 7 of the operational amplifier 21. Because of the components of the capacitor C27 and of the resistor R18 used for the hysteresis circuit, the fundamental frequency of the output signal is in proximity to ⅓ of the anticipated resonance frequency of the resonant circuit.

Figure 3:
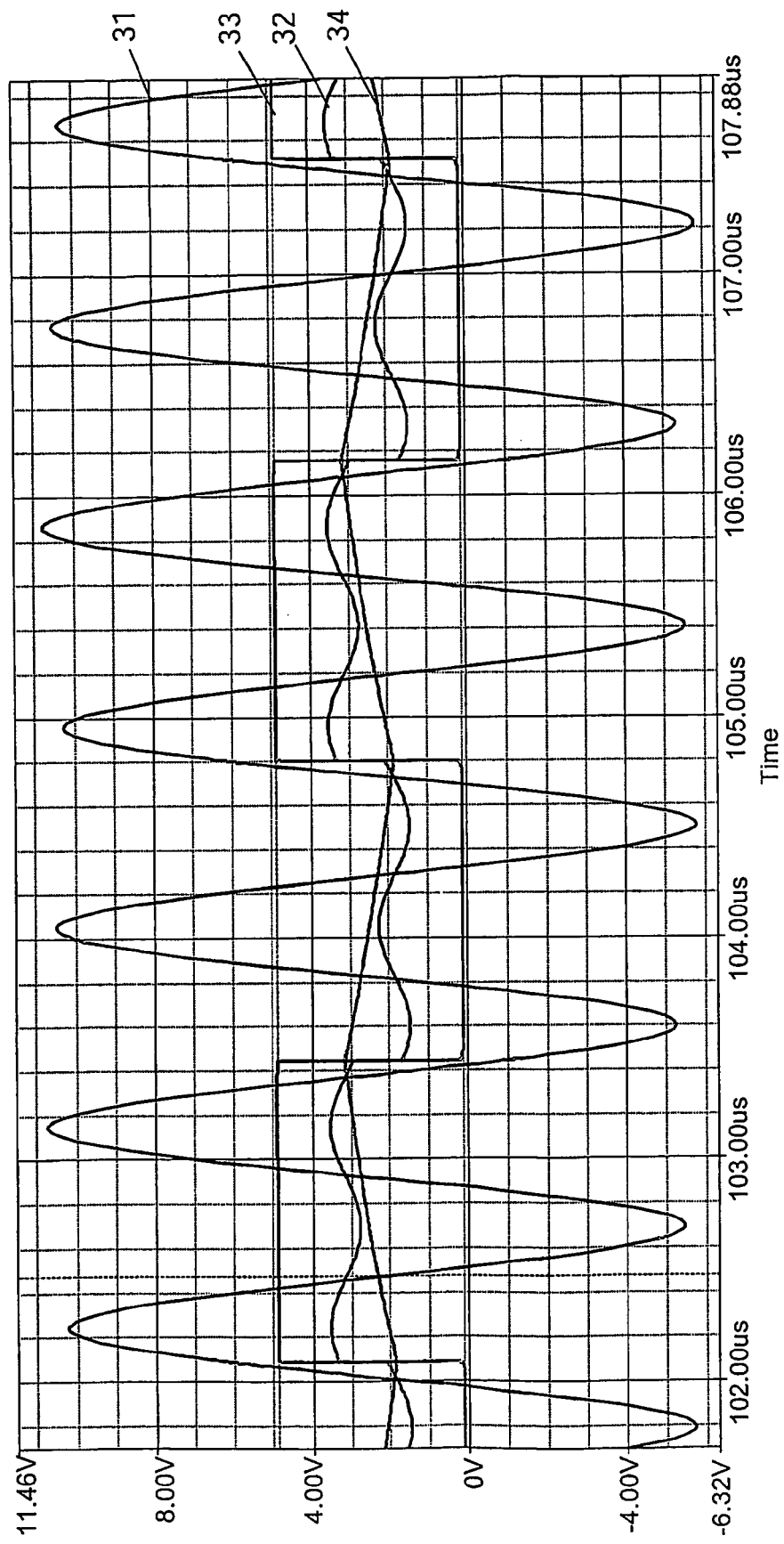
FIG. 3 shows the voltages occurring at the oscillator from FIG. 2.

In FIG. 3 the voltages occurring at the oscillator during frequency control are represented in a diagram. In the diagram the voltages concerned are plotted as four curves 31 to 34 in volts against time in μs.

Curve 31 represents the signal captured by the capacitive antenna C32. This signal 31 is composed of a substantially sinusoidal oscillation with an amplitude of approx. 8 V and a direct voltage component of approx. 2.5 V.

Curve 32 represents the signal at the first input 2 of the operational amplifier 21. Because of the potential divider, this signal 32 is, firstly, attenuated as compared to the signal 31 captured by the antenna C32; secondly, superposed on it is an additional, alternating direct voltage component which is produced by the feedback of the output 7 of the operational amplifier 21 via the hysteresis circuit. The whole direct voltage component is switched, approximately after three semioscillations of the high-voltage signal captured by the antenna, from a higher value of approx. 3V to a lower value of approx. 2V and inversely. The value of the additional, alternating direct voltage component is therefore approx. ±0.5 V.

Curve 33 represents the square-wave output signal of the operational amplifier 21 at output 7, which signal results from the comparison of the voltages supplied to the first input 2 and the second input 3 of the operational amplifier 21. The square-wave output signal 33 alternates between approx. 0 V and approx. 5 V.

Finally, curve 34 represents the voltage fed back from the output 7 of the operational amplifier 21, which has a triangular waveform as a result of the capacitor C27 and is fed to the second input 3 of the operational amplifier 21. The characteristic of the triangular-waveform voltage moves in each wave from below 2 V to above 3 V and back.

Curves 32 and 34 intersect in each case at approximately the zero transition of the voltage 31 captured via the antenna C32, and switching of the operational amplifier 21 is effected at each intersection. The feedback ensures that the switching is shifted exactly to the zero transitions of the signal 31. As soon as the switching occurs exactly simultaneously with the zero transitions of the voltage captured by the antenna 7, the output frequency of the comparator is exactly the desired integral fraction of the resonance frequency of ⅓.

Figure 4:
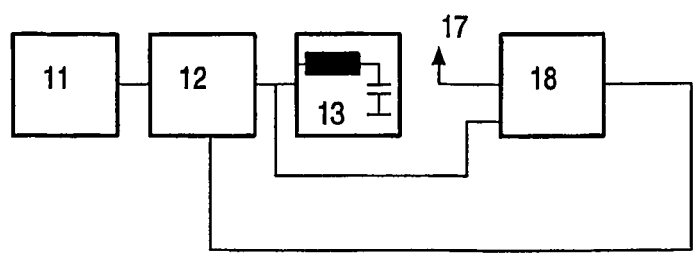
FIG. 4 shows a block diagram of a second embodiment of the circuit according to the invention having a PLL controller.

FIG. 4 shows a second embodiment of the electronic circuit according to the invention, based on the use of a PLL.

The circuit of FIG. 4 again comprises a direct voltage source 11 which is connected to a resonant circuit 13 via an converter 12. Likewise, the circuit again includes an antenna 17 as detector for the actual resonance frequency.

In contrast to the first embodiment, however, the output signal of the antenna 17 is here fed to a PLL controller 18. The output signal of the converter 12 is also fed to the PLL controller 18. In addition, the output signal of the PLL controller 18 is fed back directly to the switching elements of the converter 12.

The PLL controller 18 is so dimensioned that a frequency, based on a desired fraction of the anticipated resonance frequency, is produced at its output, at which frequency the inverter output signal and the voltage at the resonant circuit 13 have a phase shift of 90°. This makes compensation of the other delays in the circuit by means of a delay unit unnecessary.

The electronic circuit of FIG. 4 may also form part of a lighting installation in which a high-pressure lamp (not shown) is connected to the resonant circuit 13.

The embodiments described represent only two of various possible embodiments of the invention.

The invention claimed is:

1. An electronic circuit for igniting a high-pressure lamp, comprising
   resonant circuit (13) for providing an ignition voltage for the high-pressure lamp;
   a converter (12) for generating an alternating voltage with which the resonant circuit (13) is excited;
   an oscillator (14, 16, 17) for driving the converter (12), the fundamental frequency of the output voltage of the oscillator (14, 16, 17) lying at least in proximity to an integral fraction of the resonance frequency of the resonant circuit (13), and
   a feedback (17) from the resonant circuit (13) to the oscillator (14, 16, 17), whereby the fundamental frequency of the output voltage of the oscillator (14, 16, 17) is so tuned that the resulting frequency of the output voltage of the oscillator (14, 16, 17) corresponds substantially exactly to the integral fraction of the resonance frequency in proximity to which the fundamental frequency of the output voltage of the oscillator (14, 16, 17) lies.

2. The electronic circuit as claimed in claim 1, characterized in that a delay unit (15) is contained in the signal path from the oscillator (14, 16, 17) to the converter (12).

3. The electronic circuit as claimed in claim 1, characterized in that the resonant circuit (13) comprises a resonance coil whose the magnetic material reaches saturation at a predefined voltage, in particular the ignition voltage determined for the high-pressure lamp.

4. A lighting system comprising an electronic circuit as claimed in claim 1 and comprising a high-pressure lamp connected to the resonant circuit (13) of the electronic circuit.

5. The electronic circuit as claimed in claim 1, characterized in that the feedback coupling comprises a capacitive antenna (17) for detecting the output voltage of the resonant circuit (13).

6. The electronic circuit as claimed in claim 5, characterized in that the capacitive antenna (17) is formed by a conductor track configuration on a printed circuit.

7. The electronic circuit as claimed in claim 1, characterized in that the oscillator (14, 16, 17) comprises an analog comparator (14, 21).

8. The electronic circuit as claimed in claim 7, characterized in that the oscillator (14, 16, 17) has a hysteresis which determines the integral fraction of the resonance frequency in proximity to which the fundamental frequency of the output voltage of the oscillator (14, 16, 17) lies.

9. The electronic circuit as claimed in claim 1, characterized in that the oscillator comprises a digital circuit, in particular a digital PLL (phase locked loop) (18).

10. The electronic circuit as claimed in claim 9, characterized in that the digital circuit (18) utilizes both the signal of the resonant circuit (13) and the output signal of the converter (12) for frequency control.

11. A method of igniting a high-pressure lamp by means of a resonant circuit (13) supplied with an alternating voltage by an converter (12), the method comprising the following steps:
   a) driving of the converter (12) by a voltage which is output by an oscillator (14, 16, 17) such that the converter (12) outputs an alternating voltage, the fundamental frequency of the output voltage of the oscillator (14, 16, 17) lying at least in proximity to a integral fraction of the resonance frequency of the resonant circuit (13);
   b) supplying of the alternating voltage output by the converter (12) to the resonant circuit (13) so as to excite an oscillation in the resonant circuit (13);
   c) feeding the oscillation caused in the resonant circuit (13) back to the oscillator (14, 16, 17), such that the frequency of the output voltage of the oscillator (14, 16, 17) is adjusted to a value which corresponds substantially exactly to the integral fraction of the resonance frequency of the resonant circuit in proximity to which the fundamental frequency of the output voltage of the oscillator (14, 16, 17) lies, and
   d) repetition of steps a) to c) until a voltage required for ignition of the high-pressure lamp is attained at the resonant circuit (13).

12. The method as claimed in claim 11, characterized in that in step a) the signal output by the oscillator (14, 16, 17) is transmitted with a delay for driving the converter (12).

* * * * *